United States Patent [19]

Hamilton et al.

[11] Patent Number: 5,053,812
[45] Date of Patent: Oct. 1, 1991

[54] DISCONNECTABLE, REMOUNTABLE, CONNECTION SYSTEM FOR A DOCUMENT TRACK

[75] Inventors: Alistair R. Hamilton, Waterloo; Frederick W. Brouwer, Kitchener; Robert W. Phillips, Waterloo, all of Canada

[73] Assignee: NCR Corporation, Dayton, Ohio

[21] Appl. No.: 627,286

[22] Filed: Dec. 14, 1990

[51] Int. Cl.$^5$ .............................................. G03B 27/52
[52] U.S. Cl. ..................................... 355/133; 355/75; 355/308; 271/3.1
[58] Field of Search ......................... 355/133, 75, 308; 271/3.1

[56] References Cited

U.S. PATENT DOCUMENTS 4,524,963  6/1985  D'Angelo et al. .................. 271/3.1

Primary Examiner—L. T. Hix
Assistant Examiner—D. Rutledge
Attorney, Agent, or Firm—Stephen F. Jewett; Albert L. Sessler, Jr.; Elmer Wargo

[57] ABSTRACT

A disconnectable, remountable, extension for a document track in a table-top, document processing machine. The extension has first and second fingers which fit into first and second openings in a coupling member which is resiliently biased towards the document track. The extension also has members which cooperate with the document track to keep the extension aligned in a vertical direction relative to the document track. When the extension contacts another member when the machine is moved on the table top, the extension "break away" or is uncoupled from the document track without damage to either of the members. The extension can then be remounted on the document track.

8 Claims, 5 Drawing Sheets

DISCONNECTABLE, REMOUNTABLE, CONNECTION SYSTEM FOR A DOCUMENT TRACK

BACKGROUND OF THE INVENTION (1) Field of the Invention

This invention relates to disconnectable, remountable, extension for a document track in a table-top, document processing machine which enables the extension to be separated from the document track when accidentally hit by a user of the machine.

(2) Background Information

One of the problems with table-top, document processing machines is that they tend to be pushed around on a counter or table top when used by an operator of the machine. When subjected to such abuse, it is conceivable that some portions of the machine which project therefrom may become damaged, or the abuse may cause some internal damage to the machine. For example, an extension for a document track may extend from the machine to facilitate the entry of a document into the document processing machine. If the machine is moved when the extension is on the document track, it is conceivable that the damage mentioned may occur.

SUMMARY OF THE INVENTION

An object of this invention is to provide an extension for a document track which will "break away" from the document track when the extension is accidentally hit without causing any damage to the extension or the document track.

The extension according to this invention is inexpensive to manufacture, easy to install, and easy to re-install when it is accidentally knocked off the machine.

Another feature of this invention is that it can be installed by a user of the machine as an optional feature.

In a preferred embodiment of this invention, there is provided an apparatus comprising;

a document processing machine having a document track for entering/exiting documents;

an extension for said document track to support a document inserted therein; and coupling means coupling said extension to said document track to enable said extension to break away from said document track when said extension is accidentally hit by a foreign body.

The above advantages and others will be more readily understood in connection with the following description, claims, and drawing.

DETAILED DESCRIPTION OF THE INVENTION

Figure 1:
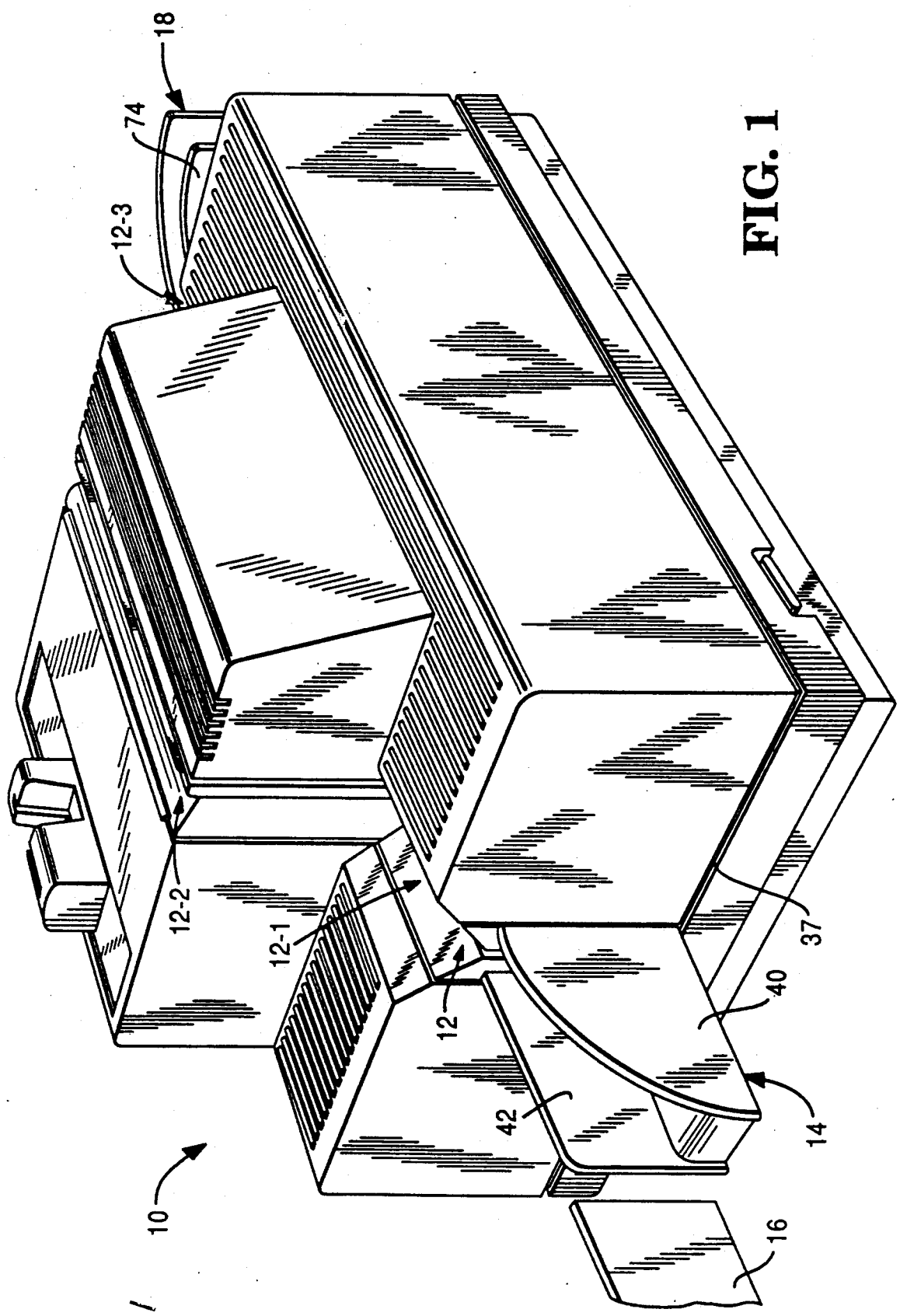
FIG. 1 is a general, isometric view of a table-top machine to which a preferred embodiment of a first extension and a second extension made according to this invention may be detachably secured.

FIG. 1 is a view of a table-top machine 10 which has a document track 12 therein which is comprised of a first portion 12-1, a second portion 12-2, and a third portion 12-3. A first extension 14, made according to this invention, is detachably secured to the first portion 12-1 of the document track 12. In the embodiment described, a document 16, like a check or deposit slip, for example, is to be manually inserted in the document track 12. The extension 14, which is detachably secured to the first portion 12-1 of the document track 12, facilitates the entry of the document 16 into the document track 12 by making it easy to align the document 16 with the track 12 and by providing a longer horizontal surface to direct the document 16 towards the bottom of the first portion 12-1 of the document track 12. The extension 14 is used for entering documents 16, and a second extension 18 is used for discharging these documents. While the machine 10 has a small size or "footprint", it is apparent from FIG. 1 that if the machine 10 is moved on a table top with the extensions 14 and 18 thereon and if the extensions hit another object on the table, it is conceivable that damage could occur to the extensions 14 or 18, the first and third portions 12-1 and 12-3 of the document track 12, or the internal parts of the machine 10 itself without the break away feature of this invention. While this invention is described relative to a table top machine, the principles of this invention may be extended to other document processing machines.

Figure 2:
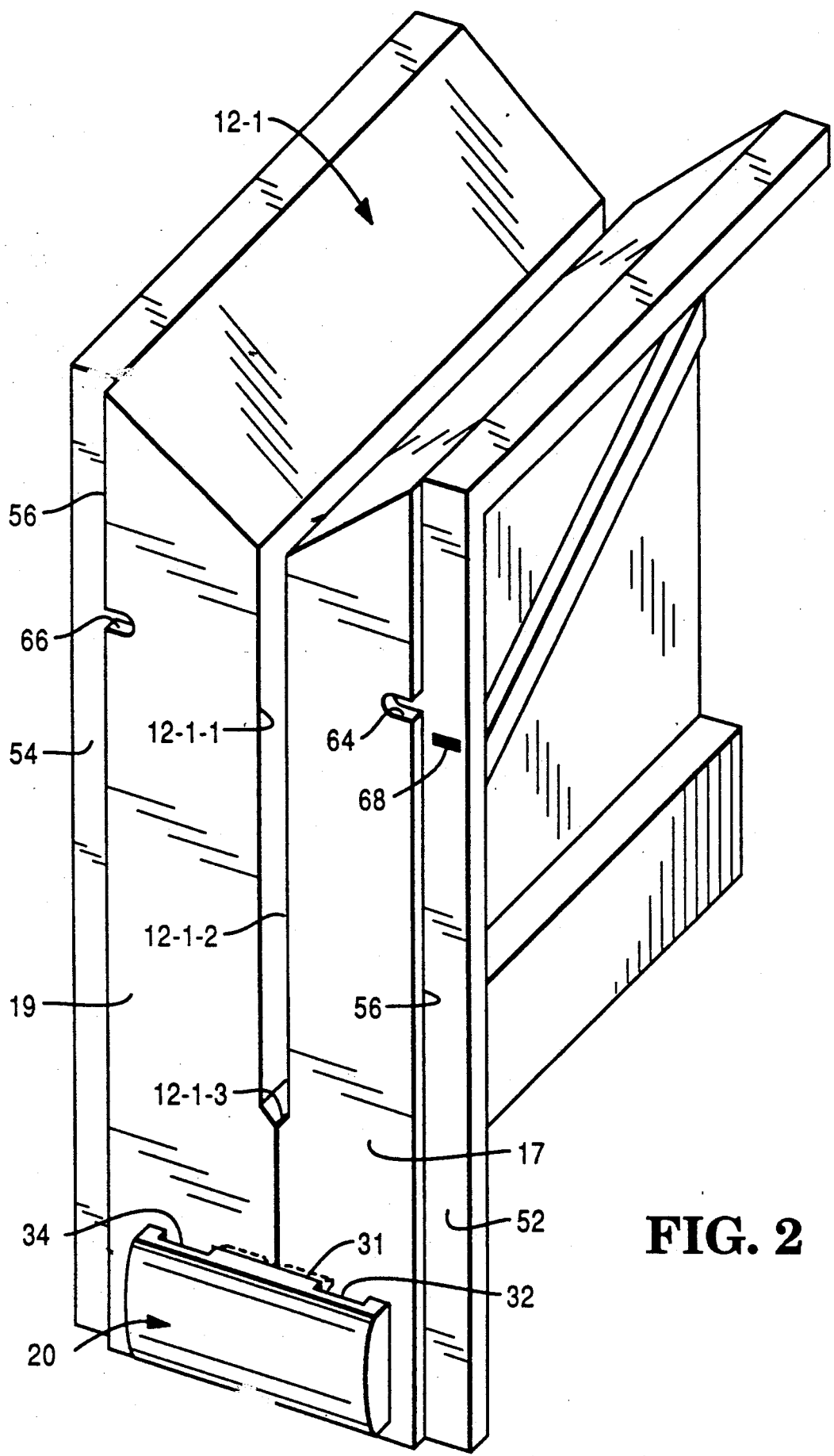
FIG. 2 is a general isometric view of a portion of a document track shown in FIG. 1, with the view showing a cooperating member secured thereto.
Figure 3:
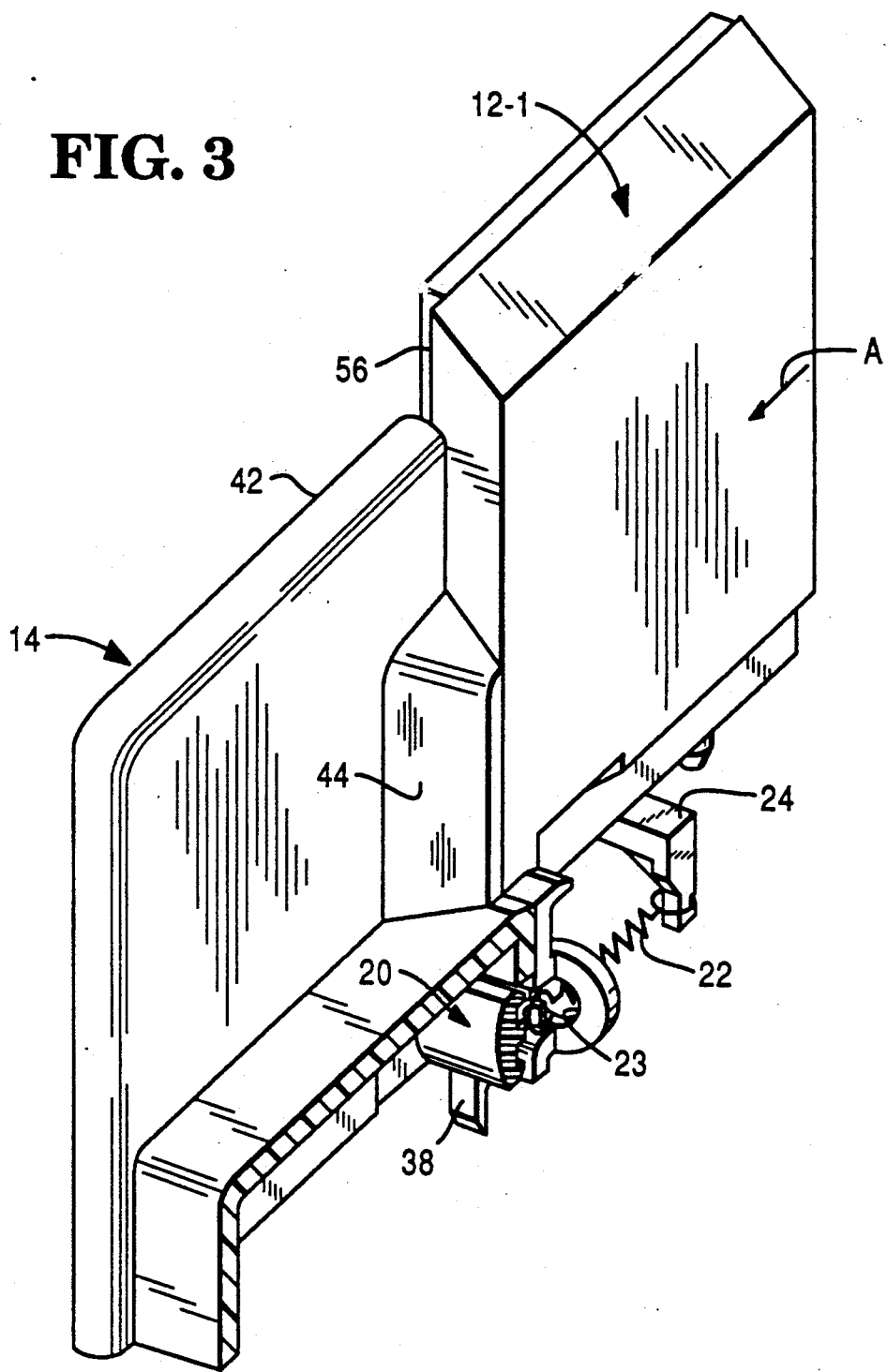
FIG. 3 is a general isometric view, partially broken away, to show the first extension secured to the document track.

FIG. 2 shows the first portion 12-1 of the document track 12 shown in FIG. 1. The first portion 12-1 has first and second side walls 12-1-1 and 12-1-2, respectively, and a bottom 12-1-3 to receive the document 16. The first portion 12-1 also has a coupling member 20 which is resiliently coupled to the first portion 12-1 by a resilient member, like a tension spring 22, shown in FIG. 3. One end of the tension spring 22 is secured to a projection 24 from the document track 12, and the remaining end thereof passes through an opening 23 of the first portion 12-1 and is secured to a loop 26 (FIG. 5) appearing on the inward side of the coupling member 20 or the side facing the document track 12. The inward side of the coupling member 20 has beveled sides 28 and 30 which mate with complementary recess 31 shown in general dashed outline in FIG. 2 on the first portion 12-1 of the document track 12 to enable the coupling member 20 to be positioned either way relative to the document track 12 and to be located thereby. The coupling member 20 is symmetrical so that it doesn't matter if it gets turned around either way a couple of times prior to being seated for use. The positioning is with regard to openings 32 and 34 (FIGS. 2 and 5) which receive first and second fingers or connecting members 36 and 38 located on the first extension 14. In this regard, the coupling member 20 may be shifted 180 degrees from the position shown in FIG. 5 and still be in a position to receive the connecting members 36 and 38.

Figure 4:
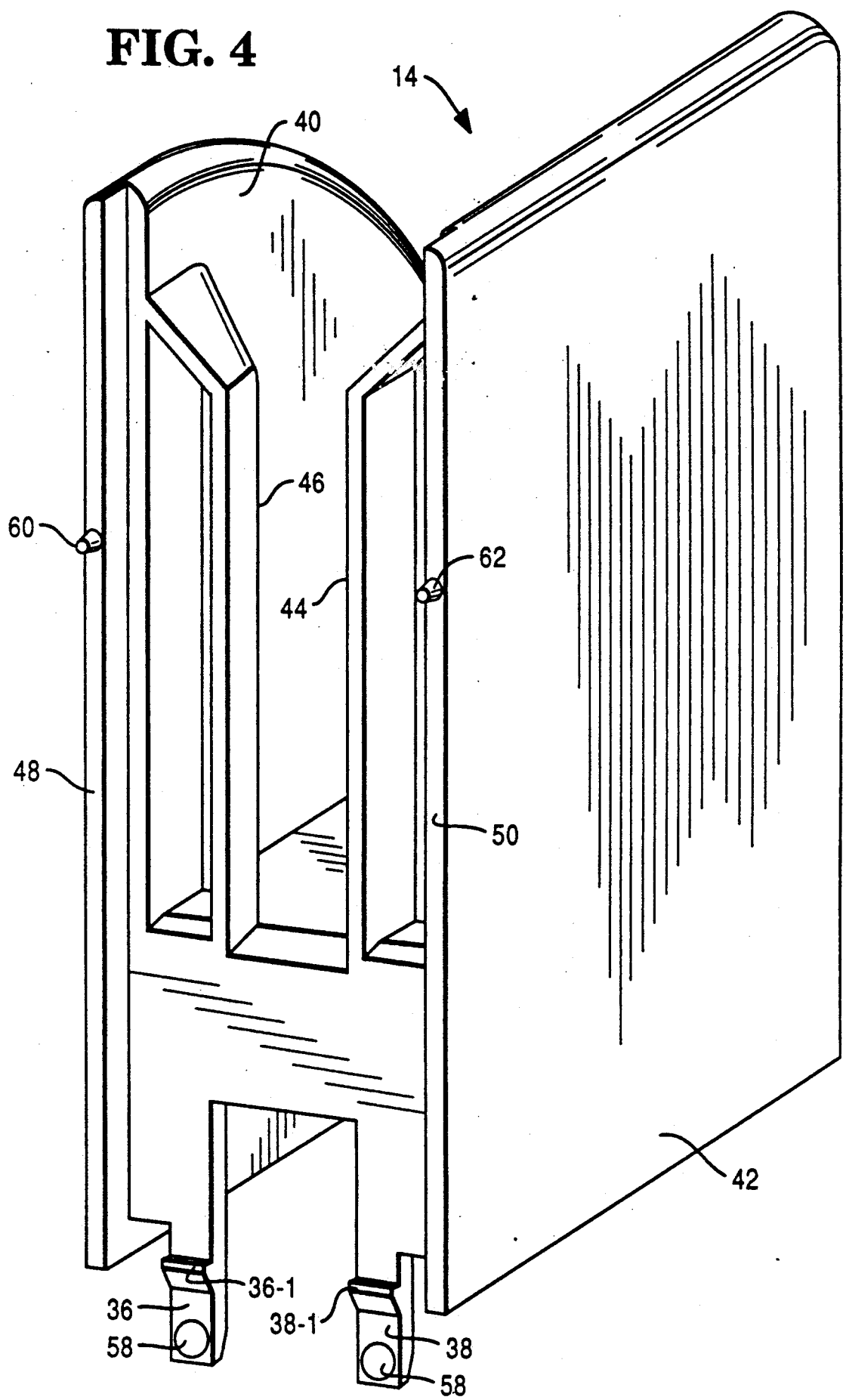
FIG. 4 is a general isometric view of a first embodiment of the first extension, with the view taken from the general direction of arrow A of FIG. 3.

The extension 14 has a front wall 40 and a rear wall 42 (FIGS. 1 and 4) which are spaced apart in parallel relationship as shown. The front wall 40 is curved and lower in height than the rear wall 42 to facilitate positioning the document 16 therein. The first extension 14 also has ramp members 44 and 46 therein, as shown in FIG. 4, to direct the document 16 from the extension 14 to the first portion 12-1 of the document track 12.

The first extension 14 also has flat walls 48 and 50 which abut against flat walls 17 and 19 of the first portion 12-1 of the document track 12 when the first extension 14 is attached thereto. There are also shallow shoulder areas 56 (FIG. 2) in the first portion 12-1 of the document track 12 against which lateral fingers 70 and 72 of a second embodiment (designated as first extension 14-2 in FIG. 5) of the first extension 14 may be seated when it is attached to the first portion 12-1.

The connecting members 36 and 38 on the first extension 14 have members 36-1 and 38-1 which rest in a complementary recess or a reveal 37 in housing of the machine 10. The connecting members 36 and 38 also have slight projections or bosses 58 thereon which help to align the first extension 14 with the first portion 12-1 of the document track 12. In effect, these bosses 58 tend to move the top of the first extension 14 owards the first portion 12-1 of the document track 12, as viewed in FIG. 1, so as to present a tight connection therebetween. The first extension 14 may also has two projections 60 and 62 (FIG. 4) which fit into mating recesses 64 and 66 shown in FIG. 2 to indicate to a customer that the first that the first extension 14 is properly located relative to the first portion 12-1 of the document track 12.

A feature of this invention is that it is easy to install on the machine 10 by a customer. To do so, the customer inserts the connecting members 36 and 38 of the extension 14 into the openings 32 and 34 in the coupling member 20 and moves the first extension downwardly until the members 36-1 and 38-1 rest in the reveal 37. A projection or mark 68 on the first portion 12-1 of the document track 12 may be used to indicate to the customer that the first extension 14 is moved downwardly far enough to be in proper position.

If the machine 10 is moved across a counter on which it is used, and if the first extension 14 abuts against a solid object, the coupling member 20 will be pulled away from the first portion 12-1 of the document track 12 against the bias of the tension spring 22. Also, the lateral fingers 70 and 72 will be pulled away from their associated shoulders 56 permitting the first extension 14 to "break away" from the first portion 12-1 of the document track 12 without damage to these elements. In the embodiment described, the first extension 14 and the document track 12 are made of a polycarbonate plastic like Lexan which is a trademark of General Electric. After breaking away, the extension, like 14 can be reinstalled on the document track 12 as previously described.

Figure 5:
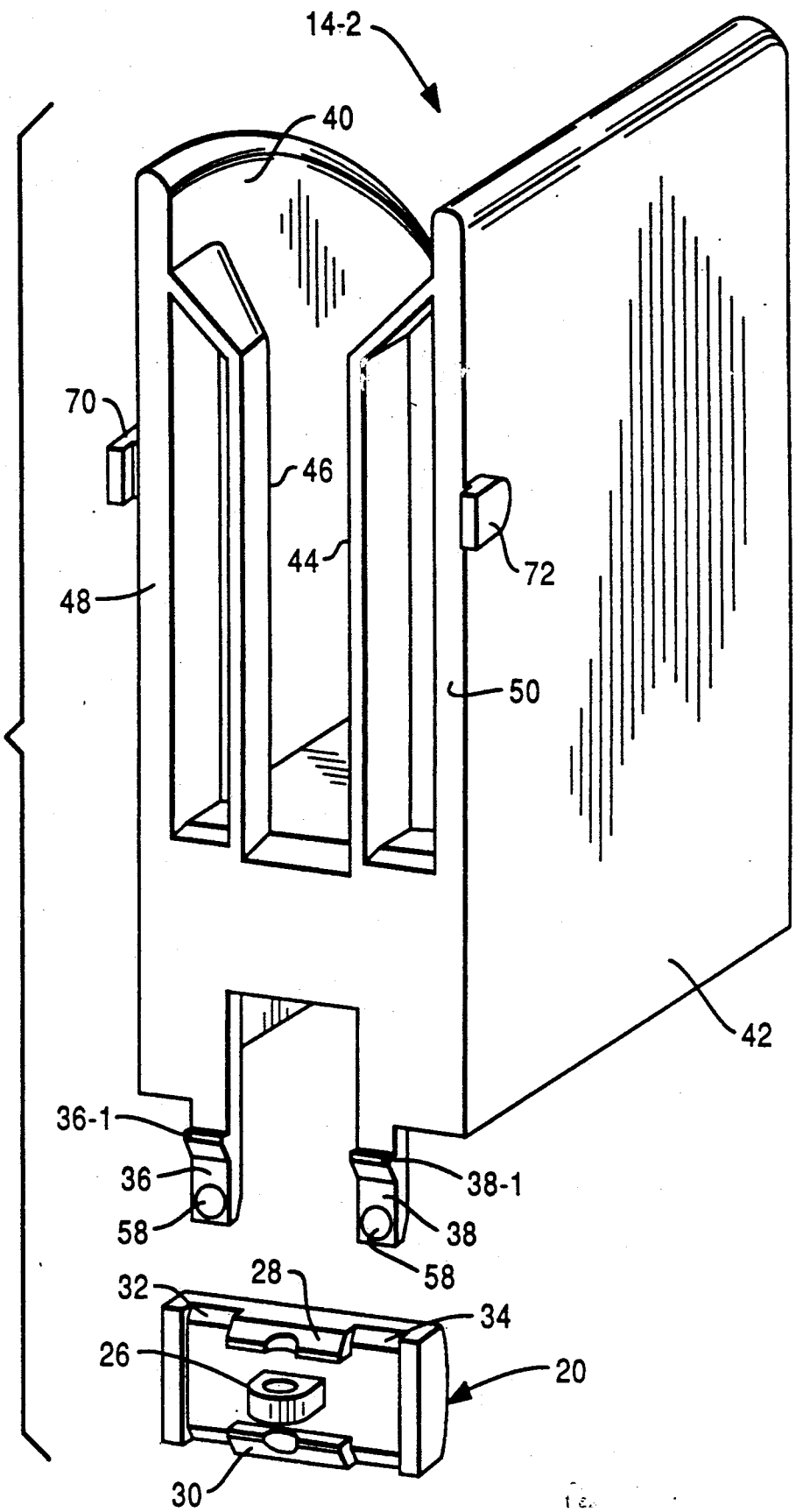
FIG. 5 is a general isometric view of a second embodiment of the first extension, with the view taken from the general direction of arrow A of FIG. 3.

A second embodiment of this invention which is designated as first extension 14-2 is shown in FIG. 5. First extension 14-2 is identical to first extension 14 except for certain points to be discussed herein; accordingly similar parts in FIG. 5 are given the same designations as those assigned to first extension 14 shown in FIG. 4, for example.

The first extension 14-2 is different from the first extension 14 in this regard. The first extension 14-2 has lateral fingers 70 and 72 which perform the same function as the projections 60 and 62 shown in FIG. 4. The lateral fingers 70 and 72 abut against the outer sides of the walls 17 and 19 (FIG. 2) to align the first extension 14-2 vertically as viewed in FIG. 2.

The second extension 18 shown in FIG. 1 is identical in construction to the first extensions 14 and 14-2 already described except as follows. The second extension has curved walls 74 and 76 which are analogous to walls 40 and 42 of the first extension 14, for example. The walls 74 and 76 are curved so as to facilitate the delivery of the document 12 towards the front of the machine 10.

What is claimed is:

1. An apparatus comprising:
   a document processing machine having a document track for entering/exiting documents;
   an extension for said document track to support a document inserted therein; and
   coupling means coupling said extension to said document track to enable said extension to break away from said document track when said extension is accidentally hit by a foreign body.

2. The apparatus as claimed in claim 1 in which said coupling means comprises:
   a coupling member;
   resilient means biasing said coupling member towards said document track;
   said extension having first and second connecting members and first and second aligning members located thereon; and
   said document track having first and second cooperating areas receiving said first and second aligning members, respectively; and
   said coupling member having first and second openings therein receiving said first and second connecting members, respectively.

3. The apparatus as claimed in claim 2 in which said first and second openings in said coupling member extend all the way through said coupling member.

4. The apparatus as claimed in claim 3 in which said document track has a recess therein and said coupling member has a detent thereon to engage said recess to position said coupling member relative to said document track.

5. The apparatus as claimed in claim 2 in which said document track has first and second notches therein to receive said first and second aligning members.

6. The apparatus as claimed in claim 2 in which said extension is shaped to direct said document into said document track.

7. The apparatus as claimed in claim 2 in which said extension is curved to direct said document to one side of said document track upon exiting said document track.

8. An apparatus comprising:
   a document track having an area for entering/exiting a document;
   a extension for said document track;
   a coupling having first and second apertures therein;
   resilient means for biasing said coupling towards said document track at said area;
   said extension having first and second mounting members and first and second alignment members thereon;
   said first and second mounting members being inserted in said first and second apertures, respectively; and
   said document track having first and second alignment areas thereon to receive said first and second alignment members to align said extension relative to said document track;
   said extension being disconnectable from said document track when accidentally hit so as to avoid damage to said document track.

* * * * *